United States Patent Office 3,702,845
Patented Nov. 14, 1972

3,702,845
CONTINUOUS PRODUCTION OF ETHYLENE HOMOPOLYMERS
Klaus Steigerwald and Oskar Buechner, Ludwigshafen, and Friedrich Urban and Helmut Pfannmueller, Limburgerhof, Germany, assignors to Badische Anilin- & Soda-Fabrik Aktiengesellschaft, Ludwigshafen (Rhine), Germany
No Drawing. Filed Feb. 11, 1970, Ser. No. 10,587
Claims priority, application Germany, Feb. 22, 1969, P 19 08 962.4
Int. Cl. C08f 1/60, 1/80, 3/04
U.S. Cl. 260—94.9 R          6 Claims

ABSTRACT OF THE DISCLOSURE

Production of ethylene homopolymers having a specific density by polymerization of ethylene under the action of organic peroxides and oxygen as free-radical-generating polymerization initiators and of polymerization modifiers at elevated temperature and superatmospheric pressure in a tubular reactor having two successive reaction zones, a mixture of ethylene, polymerization initiator and polymerization modifier being introduced continuously at the beginning of each reaction zone. Oxygen as polymerization initiator and a mixture of a polymerization modifier having a specific relatively low $C_s$ value and a polymerization modifier having a specific relatively high $C_s$ value are used in the first reaction zone, and an organic peroxide having a specific half value temperature as polymerization initiator and a mixture of a polymerization modifier having a specific relatively low $C_s$ value and a polymerization modifier having a specific relatively high $C_s$ value are employed in the second reaction zone. The ethylene homopolymers obtained have a wide molecular weight distribution and are practically devoid of very high molecular weight constituents.

---

The present invention relates to a process for the continuous production of ethylene homopolymers having a density of from 0.922 to 0.926 g./ccm. by polymerization of ethylene under the action of oxygen and organic peroxides as free-radical-generating polymerization initiators and of polymerization modifiers at reaction temperatures of from 280° to 320° C. and pressures of from 1500 to 4000 atmospheres in a tubular reactor which has two successive reaction zones of about equal length, a mixture of ethylene, polymerization initiator and polymerization modifier being continuously introduced into the reactor at the beginning of each reaction zone.

The following is typical for prior art methods of this type, cf. for example, French patent specification Nos. 1,202,623 and 904,000 and the published papers of Belgian Patent No. 943,980:

A mixture of ethylene, a polymerization initiator having a relatively low half value temperature and a polymerization modifier is introduced into the first reaction zone where the reaction temperature is kept relatively low. A mixture of ethylene, a polymerization initiator having a relatively high half value temperature and a polymerization modifier is introduced into the second reaction zone where the reaction temperature is kept relatively high. In this way it is possible to obtain products having a wide molecular weight distribution. This is desirable for example in the case of ethylene homopolymers which are to be processed into laminating film or sheet because a wide molecular weight distribution is accompanied, inter alia, by a low "neck-in" (formation of a bulge at the edges of the film while it is still capable of plastic flow after extrusion from a sheeting die). The products not only have a wide molecular weight distribution but also a fairly large fraction of very high molecular weight constituents. The latter may be a great disadvantage, for example in the case of ethylene homopolymers which are to be used in the field of laminating film; they result, inter alia, in the molten polymer having a poor "draw-down" i.e. in the extrusion of film and sheeting, there is an increasing tendency for flaws (specks and holes) to form as the thickness of the film decreases.

The object of the present invention is to provide a process of the type defined above with which it is possible to prepare ethylene homopolymers which not only have a wide molecular weight distribution but also are practically devoid of very high molecular weight constituents.

We have found that the said object is achieved by using oxygen as polymerization initiator and a mixture of a polymerization modifier having a specific relatively low $C_s$ value and a polymerization modifier having a specific relatively high $C_s$ value in the first reaction zone and an organic peroxide having a definite half value temperature as polymerization initiator and a mixture of a polymerization modifier having a specific relatively low $C_s$ value and a polymerization modifier having a specific relatively high $C_s$ value in the second reaction zone.

Accordingly, the present invention relates to a process for the continuous production of ethylene homopolymers having a density of from 0.922 to 0.26 g./ccm. by polymerization of ethylene under the action of oxygen and an organic peroxide as free-radical-generating polymerization initiators and of polymerization modifier at reaction temperatures of 280° to 320° C. and pressures of from 1500 to 4000 atmospheres in a tubular reactor which has two successive reaction zones of about the same length, a mixture of ethylene, polymerization initiator and polymerization modifier being introduced continuously into the reactor at the beginning of each reaction zone.

The process according to the invention comprises:

(1) Introducing at the beginning of the first reaction zone a mixture at a temperature of from 170° to 200° C. and a pressure of from 1500 to 4000 atmospheres which contains an amount by weight equivalent to from 5 to 100 mole p.p.m. (with reference to the ethylene) of oxygen, 0.1 to 1.0 percent by weight of a polymerization modifier having a $C_s$ value of $1.5 \times 10^{-2}$ to $1.0 \times 10^{-4}$ and 0.1 to 0.7 percent by weight of a polymerization modifier having a $C_s$ value of $2.5 \times 10^{-2}$ to $4 \times 10^{-1}$, and keeping the reaction temperature in said zone within the range from 300° to 320° C.; and (2) Introducing at the beginning of the second reaction zone a mixture at a temperature of 160° to 190° C. and a pressure of from 1500 to 4000 atmospheres which contains an amount by weight equivalent to from 3 to 20 mole p.p.m. (with reference to the ethylene) of an organic peroxide having a half value temperature in the range from 150° to 195° C., 0.1 to 1.0 percent by weight of a polymerization modifier having a $C_s$ value of $1.5 \times 10^{-2}$ to $1.0 \times 10^{-4}$ and 40 to 60% by weight of the amount used in said first reaction zone per 100 parts by weight of ethylene of a polymerization modifier having a $C_s$ value of $2.5\times10^{-2}$ to $4\times10^{-1}$, and keeping the reaction temperature in said second reaction zone within the range from 280° to 305° C., with the proviso that the ratio by weight of the mixture introduced per unit time into said first and second reaction zones if from 1:2 to 2:1.

This process enables ethylene homopolymers having a density of from 0.922 to 0.926 g./ccm. to be prepared which not only have a wide molecular weight distribution but also are practically devoid of very high molecular weight constituents.

Conventional tubular reactors are suitable for carrying out the process. The process may also be carried out in a conventional manner provided due regard is had to the peculiarities according to the invention outlined above. Rather than give further details, reference is made for example to U.K. patent specification No. 934,444.

The oxygen to be used in the process is preferably used in the form of air.

The organic peroxides to be used according to the invention should have specific half value temperatures. By "half value temperature" we mean the temperature at which half of a given amount of peroxide has decomposed after one minute.

Specific examples of organic peroxides having a half value temperature (hvt.) within the range from 150° to 195° C. are tert butyl peracetate (hvt.=154° C.), tert-butyl perbenzoate (hvt.=166° C.), ditert-butyl peroxide (hvt.=193° C.) and methyl ethyl ketone peroxide (hvt.=182° C.). It has been found that ditert-butyl peroxide is particularly suitable for the purposes of the present invention. It may be advantageous to use the peroxides in the form of solution in inert solvents in the conventional manner.

The polymerization modifiers to be used according to the invention should have specific $C_s$ values (cf. G. A. Mortimer, J. Polymer Sci., A/1,4, 881 (1966) for the concept and definition of $C_s$ value). Specific examples of suitable polymerization modifiers having relatively low $C_s$ values are methane ($C_s$ value=$7\times10^{-4}$), propane ($C_s$ value=$3.1\times10^{-3}$) and cyclohexane ($C_s$ value=$7.7\times10^{-3}$)

It has been found that propylene ($C_s$ value=$1.3\times10^{-2}$) and propane ($C_s$ value=$3.1\times10^{-3}$) are particularly suitable for the purposes of the invention. Specific examples of polymerization modifiers having relatively high $C_s$ values are n-butyraldehyde ($C_s$ value=$4.0\times10^{-1}$) and cyclohexanone ($C_s$ value=$1.1\times10^{-1}$). It has been found that propionaldehyde ($C_s$ value=$2.5\times10^{-1}$) and methyl ethyl ketone ($C_s$ value=$2.7\times10^{-2}$) are particularly suitable polymerization modifiers of this type for the purposes of the invention.

The ethylene homopolymers obtainable by the process are particularly suitable for the production of laminating film and for coating papers and fabrics.

The invention is illustrated by the following example.

EXAMPLE

A conventional tubular reactor (jacketed for temperature control) having two successive reaction zones of equal length is used, the ratio of internal diameter to length being 1:10,000 in the first zone and 1:9000 in the second zone.

A mixture at a temperature of 175° C. and under a pressure of 2300 atmospheres which contains 3000 parts by weight of ethylene, 0.29 part by weight of air (equivalent to 19.5 mole p.p.m. of oxygen with reference to the ethylene) and 21 parts by weight of propylene (polymerization modifier; $C_s$ value=$1.3\times10^{-2}$) and 10 parts of propionaldehyde (polymerization modifier;

$C_s$ value=$2.5\times10^{-1}$)

is continuously introduced per hour at the beginning of the first reaction zone. The reaction temperature is kept at from 310° to 315° C. (a) by the heat of reaction liberated and (b) the jacket cooling.

A mixture at a temperature of 180° C. and under a pressure of 2300 atmospheres which contains 3000 parts by weight of ethylene, 0.23 part by weight (equivalent to 7.8 mole p.p.m. with reference to ethylene of ditert-butyl peroxide (in the form of a 2% by weight solution in methyl acetate; half value temperature=193° C.) and 21 parts by weight of propylene (polymerization modifier; $C_s$ value=$1.3\times10^{-2}$) and 5 parts by weight of propionaldehyde (polymerization modifier;

$C_s$ value=$2.5\times10^{-1}$)

is introduced continuously per hour at the beginning of the second reaction zone. The reaction temperature is kept at from 295° to 300° C.

The ethylene homopolymer obtained at the end of the second reaction zone and the unreacted components of the reaction mixture are brought by periodic lowering of the reaction pressure to 1600 atmospheres into a separator which is at a pressure of 250 atmospheres.

In this way 1200 parts by weight per hour of ethylene homopolymer is obtained (equivalent to a yield of 20%); it has an intrinsic viscosity of 4.5 g./10 minutes and a density of 0.924 g./ ccm.; its "neck-in" is about 7% and its "draw-down" is good.

We claim:

1. A process for the continuous production of ethylene homopolymers having a density of from 0.922 to 0.926 g./ccm. by polymerization of ethylene under the action of oxygen and an organic peroxide as free-radical-generating polymerization initiators and of polymerization modifiers at reaction temperatures of 280° to 320° C. and pressures of from 1500 to 4000 atmospheres in a tubular reactor having two successive reaction zones of about equal length, a mixture of ethylene polymerization initiator and polymerization modifier being introduced continuously at the beginning of each reaction zone, which comprises
   (1) introducing at the beginning of the first reaction zone a mixture at a temperature of from 170° to 200° C. and a pressure of from 1500 to 4000 atmospheres which contains an amount by weight equivalent to from 5 to 100 mole p.p.m. with reference to the ethylene of oxygen, 0.1 to 1.0 percent by weight of a polymerization modifier having a $C_s$ value of $1.5\times10^{-2}$ to $1.0\times10^{-4}$ and 0.1 to 0.7 percent by weight of a polymerization modifier having a $C_s$ value of $2.5\times10^{-2}$ to $4\times10^{-1}$, and keeping the reaction temperature in said zone within the range from 300° to 320° C.; and
   (2) introducing at the beginning of the second reaction zone a mixture at a temperature of from 160° to 190° C., and a pressure of from 1500 to 4000 atmospheres which contains an amount by weight equivalent to from 3 to 20 mole p.p.m. with reference to the ethylene of an organic peroxide having a half value temperature in the range from 150° to 195° C., 0.1 to 1.0 percent by weight of a polymerization modifier having a $C_s$ value of from $1.5\times10^{-2}$ to $1.0\times10^{-4}$ and 40 to 60% by weight of the amount used in said first reaction zone per 100 parts by weight of ethylene of a polymerization modifier having a $C_s$ value of $2.5\times10^{-2}$ to $4\times10^{-1}$, and keeping the reaction temperature in said second reaction zone within the range from 280° to 305° C.,
with the proviso that the ratio by weight of the mixture introduced per unit time into said first and second reaction zones is from 1:2 to 2:1.

2. A process as claimed in claim 1 wherein said organic peroxide is tert-butyl peracetate, tert-butyl perbenzoate, ditert-butyl peroxide or methyl ethyl ketone peroxide.

3. A process as claimed in claim 2 wherein said polymerization modified having a $C_s$ value of $1.5 \times 10^{-2}$ to $1.0 \times 10^{-4}$ is methane, propane, cyclohexane or propylene.

4. A process as claimed in claim 3 wherein said polymerization modifier having a $C_s$ value of $2.5 \times 10^{-2}$ to $4 \times 10^{-1}$ is n-butyraldehyde, cyclohexanone, propionaldehyde or methyl ethyl ketone.

5. A process as claimed in claim 1 wherein said polymerization modifier having a $C_s$ value of $1.5 \times 10^{-2}$ to $1.0 \times 10^{-4}$ is methane, propane, cyclohexane or propylene.

6. A process as claimed in claim 1 wherein said polymerization modifier having a $C_s$ value of $2.5 \times 10^{-2}$ to $4 \times 10^{-1}$ is n-butyraldehyde, cyclohexanone, propionaldehyde or methyl ethyl ketone.

References Cited

UNITED STATES PATENTS

| | | | |
|---|---|---|---|
| 3,142,666 | 7/1964 | Deex et al. | 260—94.9 |
| 3,293,233 | 12/1966 | Erchak, Jr. et al. | 260—94.9 |
| 3,334,081 | 8/1967 | Madgwick et al. | 260—94.9 |

OTHER REFERENCES

Mortimer, G. A.: Journal of Polymer Science, A/1,4, pp. 882–888 (1966).

JAMES A. SEIDLECK, Primary Examiner

A. HOLLER, Assistant Examiner